United States Patent
Handvest (10) Patent No.: US 10,190,328 B2
(45) Date of Patent: Jan. 29, 2019

(54) CONSTRUCTION SUPPORT

(71) Applicant: DOKA GmbH, Amstetten (AT)

(72) Inventor: Werner Handvest, Weissendorn (DE)

(73) Assignee: Doka GmbH, Amstetten (AT)

( * ) Notice: Subject to any disclaimer, the term of this patent is extended or adjusted under 35 U.S.C. 154(b) by 0 days.

(21) Appl. No.: 15/942,966

(22) Filed: Apr. 2, 2018

(65) Prior Publication Data

US 2018/0223551 A1    Aug. 9, 2018

Related U.S. Application Data

(63) Continuation of application No. PCT/EP2016/073436, filed on Sep. 30, 2016.

(30) Foreign Application Priority Data

Oct. 1, 2015 (DE) .................... 10 2015 219 043

(51) Int. Cl.
*E04C 3/32* (2006.01)
*F16B 7/14* (2006.01)
(Continued)

(52) U.S. Cl.
CPC .............. *E04G 25/065* (2013.01); *E04C 3/32* (2013.01); *F16B 7/182* (2013.01); *F16B 7/14* (2013.01)

(58) Field of Classification Search
CPC ................................ E04G 25/065; E04C 3/32
See application file for complete search history.

(56) References Cited

U.S. PATENT DOCUMENTS 5,317,855 A * 6/1994 De Leeuw .............. E04G 7/307
52/638
5,318,388 A    6/1994 Papadopoulos
(Continued)

FOREIGN PATENT DOCUMENTS

CH      348806 A    9/1960
DE    4201958 A1    8/1993
(Continued)

OTHER PUBLICATIONS

English Translation of the Written Opinion for PCT/EP2016/073436 (6 pages). (Year: 2018).*

*Primary Examiner* — Rodney Mintz
(74) *Attorney, Agent, or Firm* — Muncy, Geissler, Olds & Lowe, P.C.

(57) ABSTRACT

A construction support having an outer tube extending in a longitudinal direction, and an inner tube arranged therein, extending in the longitudinal direction, adjustable in relation to the outer tube in the longitudinal direction and having an outer thread. The outer tube is an uneven rolled tube and provided with at least one guide groove during roll-production. The guide groove extends in the longitudinal direction and is open in the radially inward direction. The inner tube is a round tube and has at least one guide element protruding radially outwards that engages in the radially inwardly open guide groove such that the inner tube is interlockingly anti-rotationally arranged in the circumferential direction in the outer tube. An adjustment nut is arranged in a longitudinal end region of the outer tube in a captive manner such that it is rotatable in the circumferential direction.

19 Claims, 7 Drawing Sheets

(51) Int. Cl.
*F16B 7/18* (2006.01)
*E04G 25/06* (2006.01)

(56) References Cited

U.S. PATENT DOCUMENTS

| | | | |
|---|---|---|---|
| 5,388,666 A | 2/1995 | Schwoerer | |
| 6,349,512 B1* | 2/2002 | Berkey | E04G 25/06 52/126.6 |
| 6,467,741 B1* | 10/2002 | Shih | E04G 25/06 248/200.1 |
| 7,165,361 B2* | 1/2007 | Vanagan | E04G 7/307 52/126.6 |
| 7,761,967 B2* | 7/2010 | McCracken | E04G 25/06 29/434 |
| 8,001,733 B2* | 8/2011 | Chen | E04G 25/04 52/126.4 |
| 8,973,899 B2* | 3/2015 | Buckingham | E04G 25/061 254/105 |
| 9,441,386 B2* | 9/2016 | Buckingham | E04G 25/061 |
| 2002/0139910 A1* | 10/2002 | Shih | E04G 25/06 248/200.1 |
| 2007/0262228 A1* | 11/2007 | McCracken | E04G 25/06 249/24 |
| 2011/0131893 A1* | 6/2011 | Chen | E04G 25/04 52/126.6 |
| 2013/0146825 A1* | 6/2013 | Buckingham | E04G 25/061 254/105 |
| 2015/0144762 A1* | 5/2015 | Lam | E04G 25/04 248/542 |
| 2015/0144854 A1* | 5/2015 | Buckingham | E04G 25/061 254/93 R |
| 2016/0356051 A1* | 12/2016 | Buckingham | E04G 25/061 |
| 2017/0275994 A1* | 9/2017 | Moye | E04G 25/04 |

FOREIGN PATENT DOCUMENTS

| | | |
|---|---|---|
| DE | 4311649 A1 | 11/1993 |
| DE | 19503296 A1 | 8/1996 |
| DE | 10 2012 211 384 A1 | 1/2014 |
| GB | 2407842 A | 5/2005 |
| WO | WO 92/13156 A1 | 8/1992 |
| WO | WO 2007/039422 A2 | 4/2007 |

* cited by examiner

CONSTRUCTION SUPPORT

This nonprovisional application is a continuation of International Application No. PCT/EP2016/073436, which was filed on Sep. 30, 2016, and which claims priority to German Patent Application No. 10 2015 219 043.9, which was filed in Germany on Oct. 1, 2015, and which are both herein incorporated by reference.

BACKGROUND OF THE INVENTION

Field of the Invention

The present invention relates to a construction support having an axial longitudinal direction, a circumferential direction concentric thereto and a radial direction comprising an outer tube extending in the longitudinal direction and an inner tube having an outer thread arranged therein extending in the longitudinal direction and adjustable in the longitudinal direction relative the outer tube.

Description of the Background Art

Construction supports are known in the conventional art. For example, DE 10 2012 211 384 has a length adjustable support that has a supporting section, which has a hollow cross-section in a portion of length that contains an end of the supporting section and an externally threaded section in its two end areas, to which the hollow end belongs. WO 2007/039422 has a support device having a first vertical support element and a wall disposed around a longitudinal axis, which defines an axial cavity, inside which a second vertical support element can be inserted.

The conventional construction supports, however, are not sturdy, easy to operate or economical to produce.

SUMMARY OF THE INVENTION

It is therefore an object of the present invention to provide a construction support that is sturdy, easy to operate and economical to produce.

This problem is solved in an exemplary embodiment according to the invention in a construction support by the outer tube being an uneven rolled tube, the outer tube being provided with at least one guide groove during roll-production which extends in the longitudinal direction and is open in a radially inward direction, by the inner tube being a round tube and having at least one radially outwardly protruding guide element which engages into the radially inwardly open guide groove such that the inner tube is thereby interlockingly anti-rotationally arranged in the circumferential direction in the outer tube and that an adjustment nut having an inner thread that is able to be screwed to the outer thread of the inner tube is arranged in a longitudinal end region of the outer tube in a captive manner yet such that it is rotatable in the circumferential direction, and by the inner tube being able to be adjusted in the longitudinal direction relative to the outer tube by rotating the adjustment nut, wherein the guide element slides in the guide groove.

In accordance with an embodiment of the invention, the outer tube is economically produced in a rolling process. During the rolling process, the tube is provided with the at least one radially inwardly open and longitudinally extending guide groove. Because of the guide groove, the outer tube has an uneven profile for receiving the guide element. This thereby realizes a rotational locking of the inner tube in the outer tube.

With the inventive design to the construction support, the inner tube is longitudinally adjusted relative to the outer tube, and thus the construction support longitudinally adjusted, by rotating the adjustment nut. The inner tube is thereby translationally adjusted in the longitudinal direction relative to the outer tube, whereby the guide element of the inner tube slides axially in the guide groove of the outer tube. At the same time, the inner tube is fixed in the axial longitudinal direction by the adjustment nut and the engaging into or dropping out of the inner tube from the outer tube is reliably prevented.

It has proven particularly advantageous for the outer tube to be made of a steel alloy, for example, to be galvanized to protect against corrosion.

The inner tube can be made of a steel alloy. It has proven advantageous for the inner tube to also be produced in a rolling process and galvanized.

The outer thread of the inner tube can be produced in a non-cutting forming process, for example, a thread rolling process or thread roller process.

It has proven very particularly advantageous for the outer tube to comprise multiple, preferably two, three or four longitudinally extending guide grooves and for the inner tube to correspondingly comprise multiple, preferably two, three or four guide elements engaging in the guide grooves. Because the guide elements engage in the guide grooves, the inner tube is arranged in the outer tube so as to be non-rotatable in the circumferential direction.

The guide element of the inner tube can be realized in many ways. It is conceivable for the guide element to be formed by the addition of material, for example by welding on wing-like extension elements. Preferably, the guide element is formed by a radially outward-directed deforming of the material of the inner tube, for example by localized material deformation in the form of a radially outward pressed projection. According to an embodiment, the guide element is integrally formed from the material of the inner tube by scoring and radial outward expanding or bending.

In an embodiment, the guide element can be formed by at least one, preferably two pins. The pins are inserted through a respective opening in the inner tube and protrude radially outwardly.

In order to ensure the inner tube can be axially adjusted relative to the outer tube over the greatest possible distance, it has proven advantageous for the outer thread of the inner tube to extend over the largest length of the inner tube as possible.

Further proven to be particularly advantageous is for the guide element to be formed in or on a longitudinal end region of the inner tube arranged in the outer tube. Preferably, this longitudinal end region of the inner tube extends 30 cm in the longitudinal direction from an end of the inner tube arranged in the outer tube and the guide element is disposed within the longitudinal end region.

In order to prevent the adjustment nut from being unintentionally screwed out, it is conceivable for the outer thread of the inner tube to be limited by a weld point or pinching. In an embodiment, the inner tube is provided with an unthreaded section. In particular, the outer thread ends at an area at least 30 cm before the end of the inner tube.

As initially noted, the adjustment nut is captively arranged on the outer tube. According to an embodiment, the adjustment nut is interlockingly arranged on the outer tube in the axial direction by means of a retaining element, albeit with play and rotatable in the circumferential direction. The retaining element can be positively held in the axial direction on the outer tube. It is conceivable for the retaining element to be held on the outer tube e.g. by material bond.

The retaining element can be realized in different ways and different configurations, for instance U-shaped. Advantageously, however, the retaining element is a retaining ring spanning the outer tube.

In an embodiment, the outer tube comprises a support section in the longitudinal end region for axially bearing the retaining element from below. The support section can be realized in different ways, in particular by the addition of material, e.g. welding on wing-like or annular expansion pieces. Preferably, the support section is formed by a radially outward deformation of the outer tube's material. Particularly preferentially, the support section is integrally formed from the material of the outer tube, preferably by scoring and bending. It is entirely conceivable for the adjustment nut to be axially seated on the support section of the outer tube from above.

After the inner tube is inserted into the outer tube, the adjustment nut is positively connected to the retaining element. Advantageously, the retaining element comprises at least one projection radially deflectable inwardly into an axial engagement position rearward the adjustment nut. It is conceivable for the radially inward deflectable projection of the retaining element to be beaded with an edge of the adjustment nut. Preferably, the radial inward deflectable projection positively engages into a circumferential groove of the adjustment nut.

In an embodiment, the longitudinal end region of the outer tube itself forms a retaining element for the adjustment nut. To that end, the longitudinal end region comprises a deflector. It is conceivable for the deflector to be formed by the addition of material, for example by welding on flange-like sections. Preferably, the deflector(s) are integrally formed from the outer tube material by a radial outward deformation.

According to an embodiment, the deflector of the longitudinal end section are at least a radially outwardly protruding section having at least one projection radially deflectable inwardly into an axial engagement position rearward the adjustment nut. Preferably, the radially inward deflectable projection engages into a circumferential groove of the adjustment nut.

Furthermore proven as very particularly advantageous is for the adjustment nut to comprise multiple, preferably three or four tool attachment points, in particular wing-like hammer stop surfaces.

Proven advantageous for the effective use of the construction support is for the outer tube and the inner tube to comprise an accommodation for a base plate and a face plate and the base and face plate to be formed such that a further base and face piece can be attached thereto, in particular centrically.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4b is a top view from the axial direction of an adjustment nut according to FIG. 4a;

FIG. 6b is a top view from the axial direction of a retaining element according to FIG. 6a;

DETAILED DESCRIPTION

The figures show a construction support 2 having an axial longitudinal direction 4, a circumferential direction 6 concentric thereto, and a radial direction 8. The construction support 2 comprises an outer tube 10 extending in the longitudinal direction 4 and an inner tube 12 arranged therein. The construction support 2 further comprises an adjustment nut 14 arranged in a longitudinal end region 16 of the outer tube 10 in a captive manner to be described in greater detail further below, albeit so as to be rotatable in circumferential direction 6 and by means of which the inner tube 12 can be adjusted in the axial longitudinal direction 4 relative to the outer tube 10.

Figure 2A:
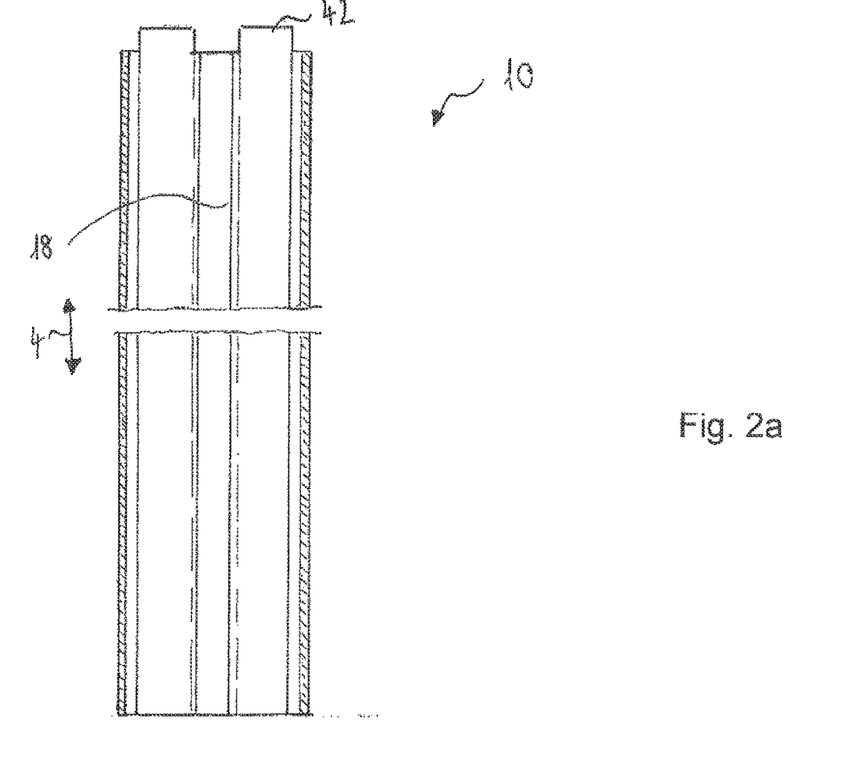
FIG. 2a is a side view of an outer tube.
Figure 2B:
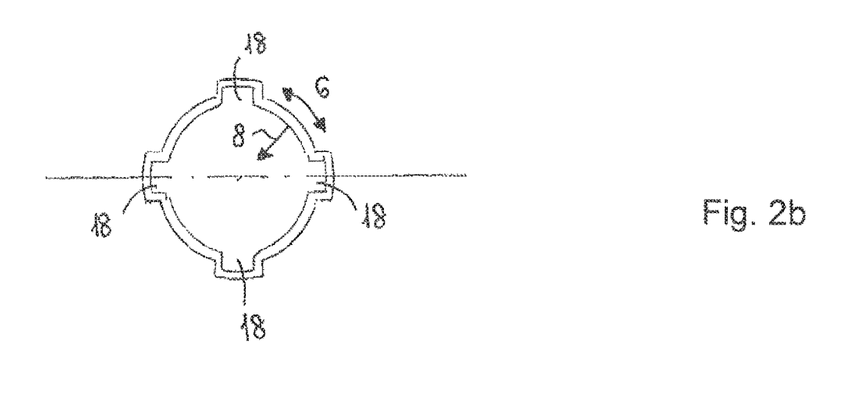
FIG. 2b is a cross section through an outer tube.

The outer tube 10 is provided with at least one, and according to an embodiment pursuant to FIGS. 2a and FIG. 2b, with four longitudinal guide grooves 18 extending in the axial direction 4 during roll-production and thereby exhibits an uneven profile. The longitudinal guide grooves 18 are open radially inwardly and are arranged at a 90° offset from each other. When two or respectively three longitudinal guide grooves 18 are provided, it can be expedient for reasons of symmetry for same to be arranged diametrically opposite or respectively at a 120° offset from each other.

Figure 3A:
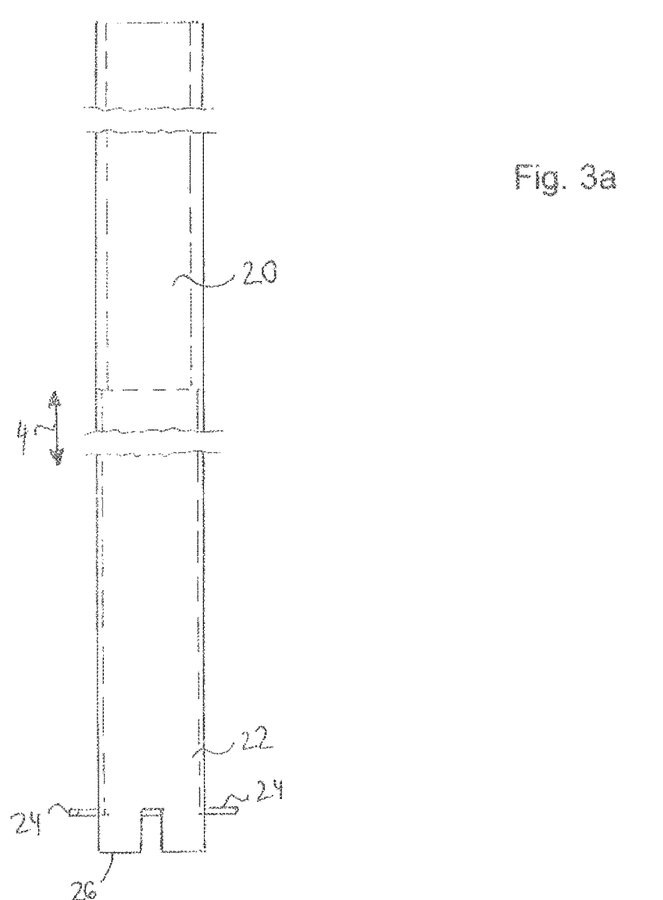
FIG. 3a is a side view of an inner tube.
Figure 3B:
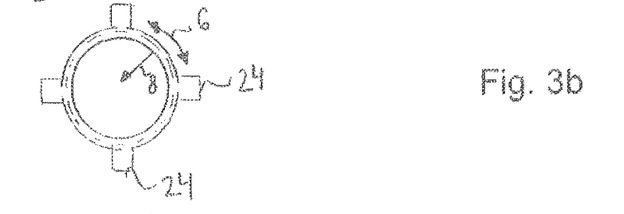
FIG. 3b is a cross section through an inner tube.

The inner tube 12 is a round tube having an outer thread 20. In an embodiment according to FIGS. 3a and 3b, four radially outward protruding guide elements 24 are provided in an unthreaded longitudinal end region 22 thereof. The guide elements 24 are arranged at a 90° offset from each other corresponding to the longitudinal guide grooves 18. The guide elements 24 are integrally formed from the material of the inner tube 12 by scoring at a lower edge 26 and bending radially inwardly. When the inner tube 12 is inserted into the outer tube 10, the guide elements 24 radially engage inwardly into the longitudinal guide grooves 18. The inner tube 12 is thereby anti-rotationally arranged in the outer tube 10.

Figure 3C:
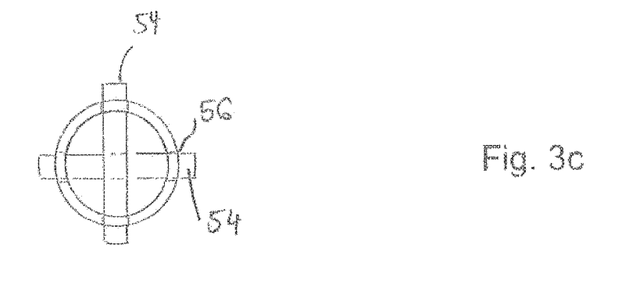
FIG. 3c is a cross section through an inner tube according to an embodiment.

In an embodiment according to FIG. 3c, the guide elements 24 are formed by two pins 54. The pins 54 are inserted through a respective opening 56 in the inner tube 12 and protrude radially outwardly. When the inner tube 12 is inserted into the outer tube 10, the radially outward protruding pins 54 radially engage inwardly into the longitudinal guide grooves 18. The inner tube 12 is thereby anti-rotationally arranged in the outer tube 10.

Figure 4A:
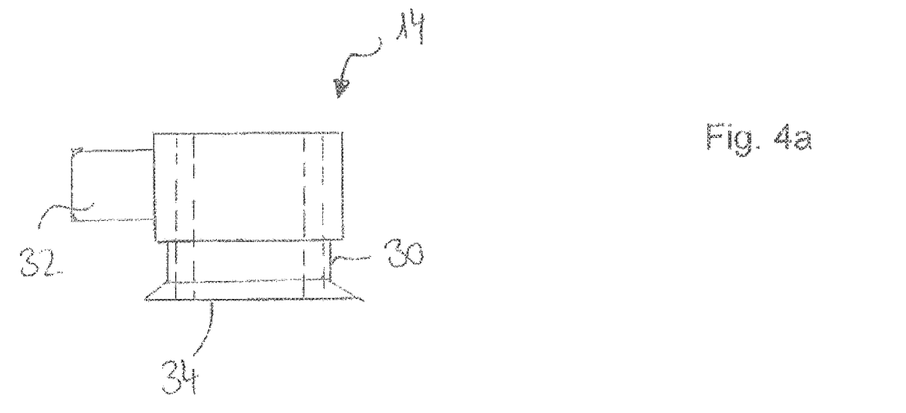
FIG. 4a is a side view of an adjustment nut according to an embodiment.
Figure 4B:
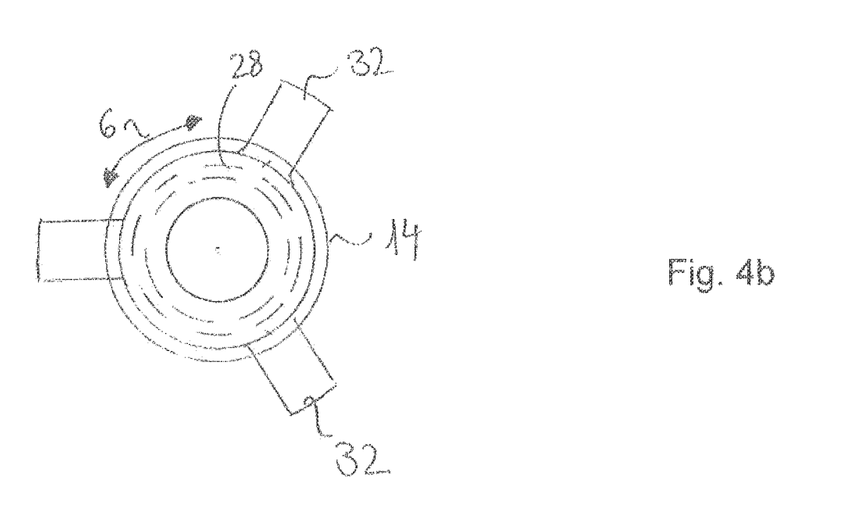

The adjustment nut 14 comprises an inner thread 28 which is able to be screwed to the outer thread 20 of the inner tube 12 and a circumferential groove 30. According to one preferential embodiment pursuant to FIG. 4b, the adjustment nut 14 further comprises multiple, in particular three tool attachment points 32. Wing-like hammer stop surfaces have proven to be advantageous.

Figure 5:
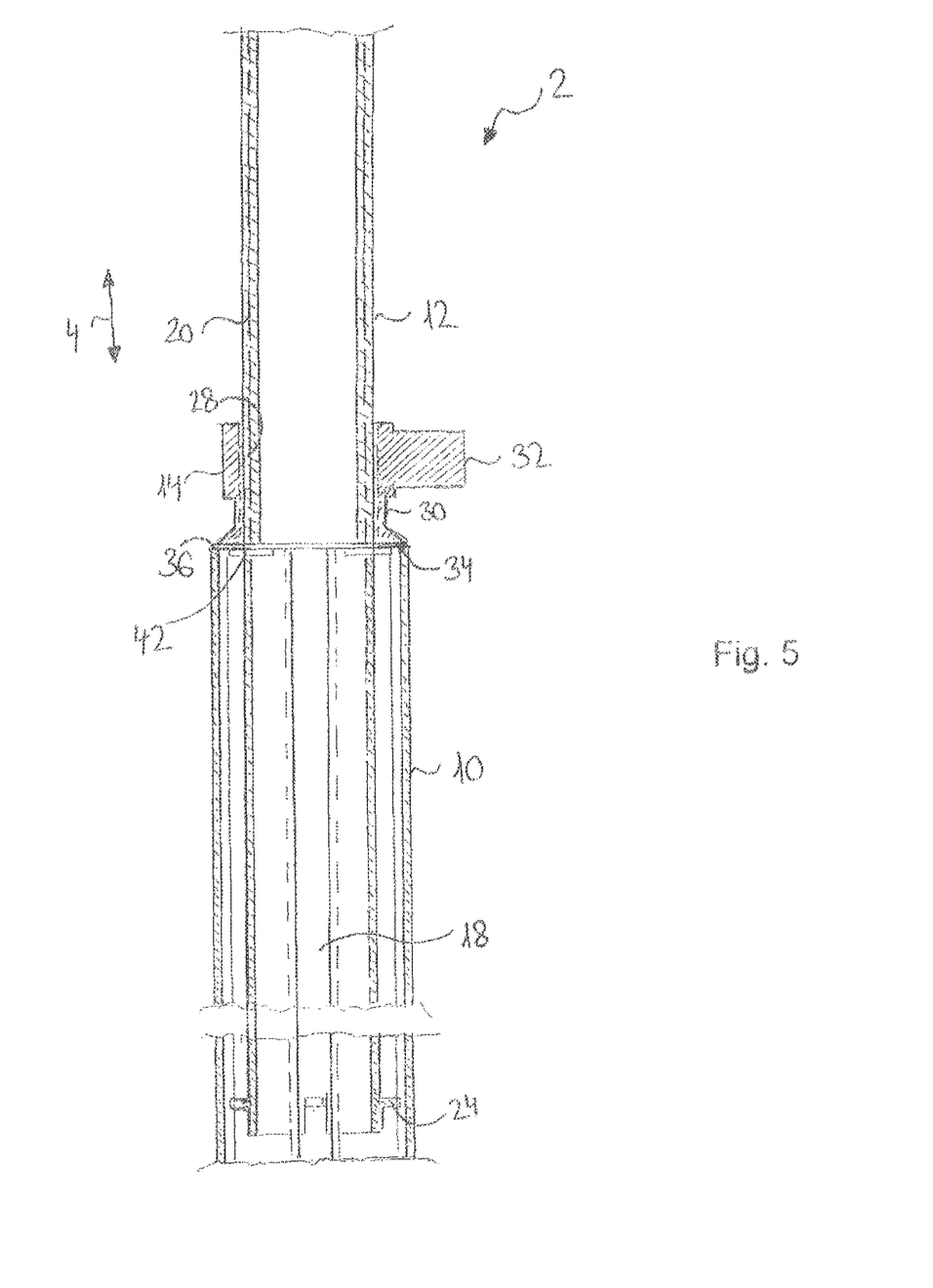
FIG. 5 is a sectional side view of an inventive construction support.

FIG. 5 shows the inventive construction support 2, wherein the inner tube 12 is arranged in the outer tube 10. The adjustment nut 14 is screwed onto the inner tube and is seated by a lower end 34 as per the position shown in FIG. 5 on an upper end 36 in the longitudinal end region 16 of the outer tube 10. The guide elements 24 of the inner tube 12 engage into the longitudinal guide grooves 18 of the outer tube 10. Rotating the adjustment nut 14 adjusts the inner tube 12 in the axial longitudinal direction 4 relative to the outer tube 10. The guide elements 24 slide in the longitudinal guide grooves 18, resulting in the inner tube 12 moving translationally relative to the outer tube 10 by the rotating of the adjustment nut 14. At the same time, the inner tube 12 screwed into the adjustment nut 14 is fixed in the axial longitudinal direction 4 by the adjustment nut 14 since the adjustment nut 14 is captively held on the outer tube 10 in a manner to be described in greater detail further below. An unwanted inner tube 12 engaging into or dropping out of the outer tube 10 is prevented since the inner tube 12 can only be adjusted in the longitudinal direction 4 by rotating the adjustment nut 14.

Figure 1:
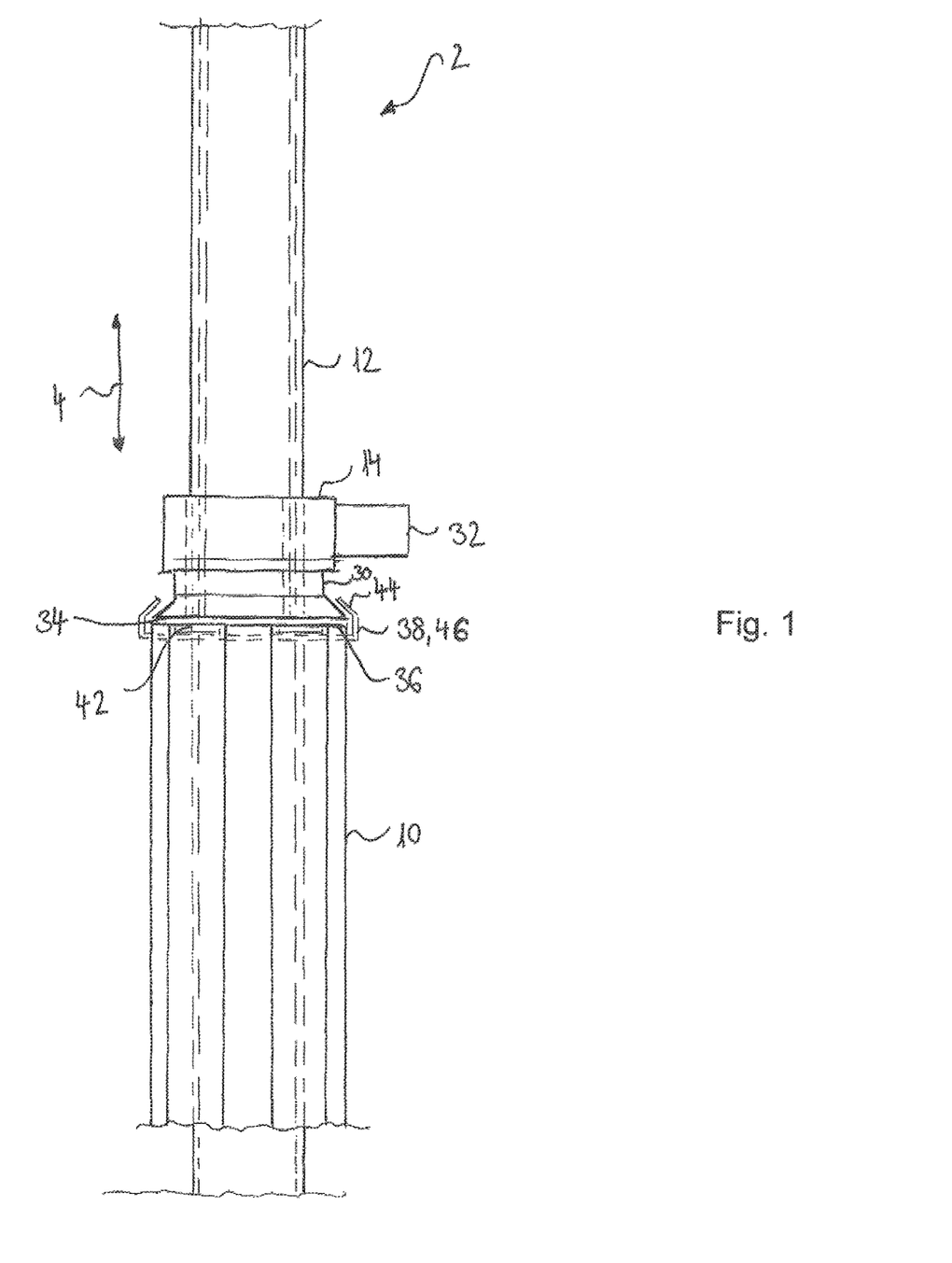
FIG. 1 is a detail of a side view of the inventive construction support according to an embodiment.
Figure 6A:
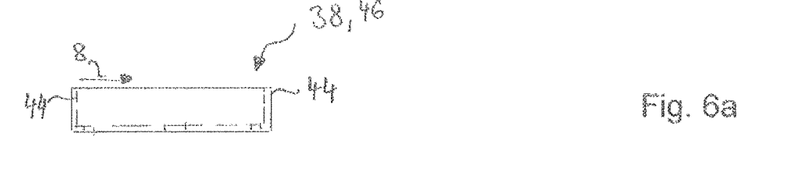
FIG. 6a is a side view of a retaining element according to an embodiment.
Figure 6B:
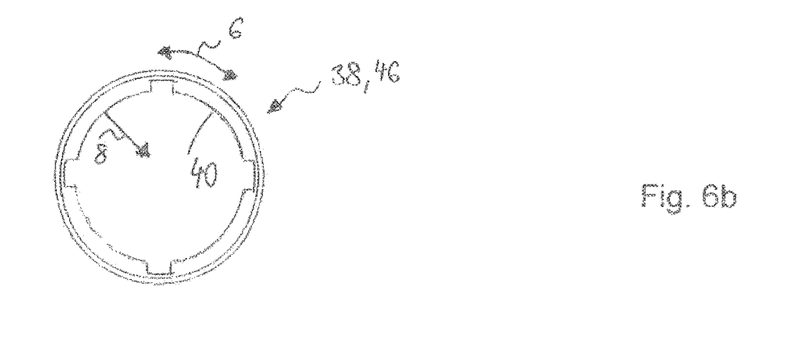

The adjustment nut 14 according to FIG. 1 is interlockingly arranged on the outer tube 10 in the axial direction by means of a retaining ring 38, albeit with play and rotatable in the circumferential direction. The retaining ring 38 spans the outer tube 10 and, in accordance with FIG. 6b, has an inner profile 40 which interacts with the uneven profile of the outer tube 10.

Figure 2C:
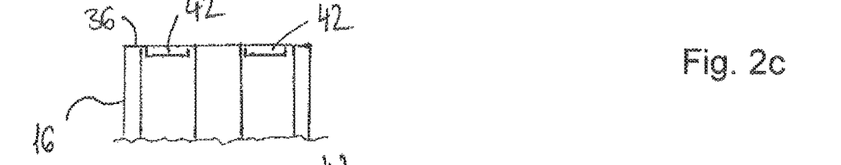
FIG. 2c is a detail view of an outer tube.

In an embodiment, support sections 42 are provided on the outer tube 10. FIGS. 2a and 2c in particular show the support sections 42 in the longitudinal end region 16 of the outer tube 10. Preferably, the support sections 42 are integrally formed from the material of the outer tube. The outer tube 10 is scored axially on top in the area between the longitudinal guide grooves 18 such that four tongue-like sections remain. These are bent in such a way that they form radially outward protruding support sections 42. Preferably, the retaining ring 38 is first axially set onto the outer tube from above and thereafter the support sections 42 formed so that the retaining ring 38 axially abuts the support sections 42 from below. When the inner tube 12 with the adjustment nut 14 screwed on is positioned in the outer tube as per FIG. 1, the adjustment nut 14 axially rests on the support sections 42 from above and the radially inwardly deflectable projections 44 of the retaining ring 38 are radially bent inward such that the projections 44 engage in a circumferential groove 30 of the adjustment nut 14. The adjustment nut 14 is thus captively held on the outer tube 10 by the retaining ring axially abutting against the support sections 42 from below and by the projections 44 of the retaining ring engaging into the circumferential groove 30. The projections 44 engage into the circumferential groove 30 with play such that the adjustment nut 14 can be rotated in circumferential direction 6 and the inner tube 12 can be adjusted in the longitudinal direction 4 relative to the outer tube 10 by the rotating of the adjustment nut 14.

Figure 6C:
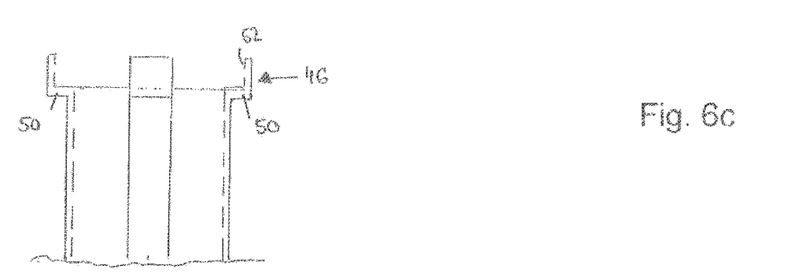
FIG. 6c is a side view of a retaining element according to an embodiment.
Figure 6D:
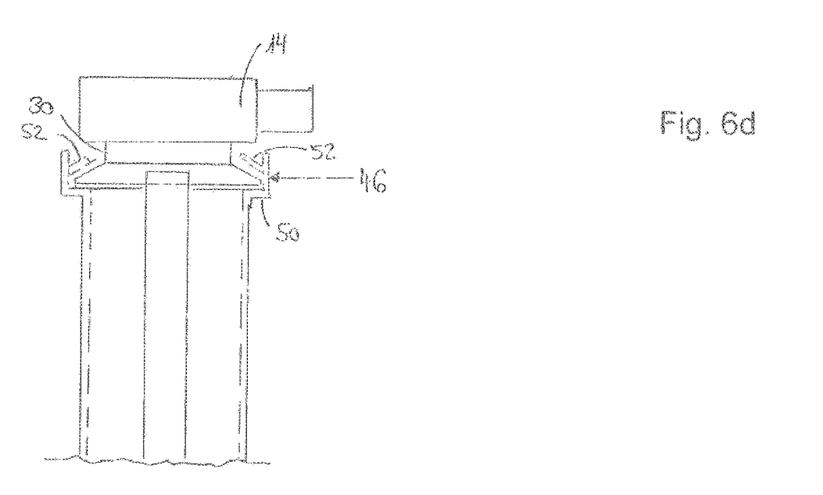
FIG. 6d is a side view of a retaining element according to FIG. 6c with an adjustment nut.
Figure 7:
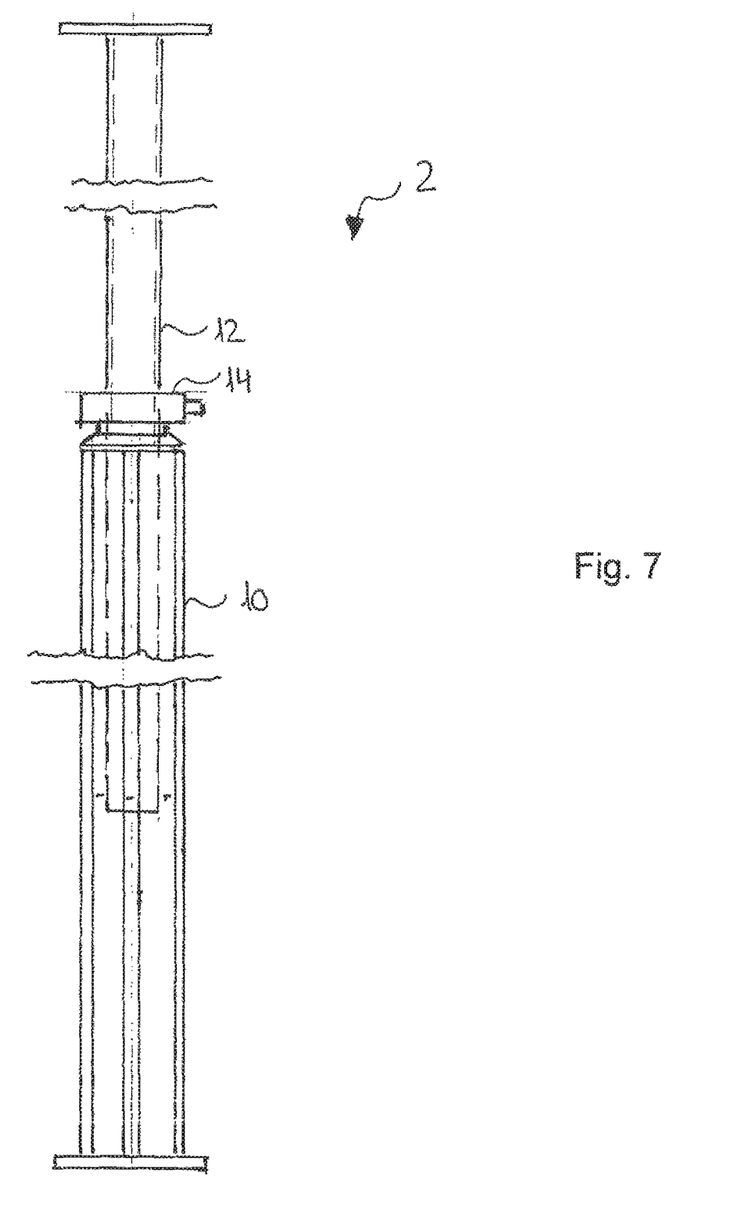
FIG. 7 is a side view of the inventive construction support according to an embodiment.

According to an embodiment, the retaining element is formed from the longitudinal end region 16 of the outer tube 10. FIGS. 6c and 6d show the longitudinal end region 16 of the outer tube with a retaining element, which can include a deflector 46. The outer tube 10 is scored axially on top in the area between the longitudinal guide grooves 18 such that multiple deflectors 46 remain. These are bent in such a way that they form radially outward protruding sections 50 with radially inwardly deflectable projections 52. The radially inward deflectable projections 52 engage into the circumferential groove 30 with play such that the adjustment nut 14 can be rotated in circumferential direction 6 and the inner tube 12 can be adjusted in the longitudinal direction 4 relative to the outer tube 10 by the rotating of the adjustment nut 14.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A construction support having an axial longitudinal direction, a circumferential direction concentric thereto and a radial direction, the construction support comprising:
   an outer tube extending in the longitudinal direction;
   an inner tube arranged in the outer tube, the inner tube extending in the longitudinal direction and being adjustable in the longitudinal direction relative to the outer tube, the inner tube having an outer thread; and
   an adjustment nut having an inner thread,
   wherein the outer tube is an uneven rolled tube and is provided with at least one guide groove during a roll-production that extends in the longitudinal direction and is open in the radially inward direction,
   wherein the inner tube is a round tube and has at least one radially outwardly protruding guide element that engages into the radially inwardly open guide groove such that the inner tube is thereby interlockingly anti-rotationally arranged in the circumferential direction in the outer tube,
   wherein the inner tube is provided with a threaded longitudinal end region that contains the outer thread and an unthreaded longitudinal end region that contains the guide element, and
   wherein the adjustment nut is adapted to be screwed to the outer thread of the inner tube and is arranged in a longitudinal end region of the outer tube in a captive manner such that the adjustment nut is rotatable in the circumferential direction,
   wherein the adjustment nut is captively held on the outer tube,
   wherein the inner tube is adapted to be adjusted in the longitudinal direction relative to the outer tube by rotating the adjustment nut, and
   wherein the guide element slides in the guide groove.

2. The construction support according to claim 1, wherein the outer tube is made of a steel alloy or wherein the outer tube is galvanized.

3. The construction support according to claim 1, wherein the inner tube is made of a steel alloy.

4. The construction support according to claim 1, wherein the outer thread of the inner tube is produced in a non-cutting forming process, a thread rolling process, or thread roller process.

5. The construction support according to claim 1, wherein the outer tube comprises multiple guide grooves extending in the longitudinal direction, and wherein the inner tube correspondingly comprises multiple guide elements engaging into the guide grooves.

6. The construction support according to claim 1, wherein the guide element of the inner tube is formed by a radially outward-directed deformation of the material of the inner tube.

7. The construction support according to claim 1, wherein the guide element is produced by scoring and subsequent outward expanding or bending of the material of the inner tube.

8. The construction support according to claim 1, wherein the guide element is formed in or on a longitudinal end region of the inner tube arranged in the outer tube.

9. The construction support according to claim 1, wherein the guide element is formed by at least one pin inserted through an opening in the inner tube and protruding radially outwardly.

10. The construction support according to claim 1, wherein the outer tube or the inner tube comprise an accommodation for a base plate or a face plate and the base plate or the face plate are formed such that a further base plate or a further face plate is attachable thereto centrically.

11. The construction support according to claim 1, wherein the inner thread of the adjustment nut engages solely with the outer thread of the inner tube and the guide element of the inner tube engages solely with the guide groove of the outer tube, and wherein a portion of the material of the inner tube is bent outwardly in a radial direction forming a radially-extending tab that is monolithic with the inner tube, the radially-extending tab being the guide element of the inner tube.

12. The construction support according to claim 1, wherein the longitudinal end region of the outer tube comprises at least one deflector which forms a retaining element for the adjustment nut.

13. The construction support according to claim 12, wherein the at least one deflector of the longitudinal end region of the outer tube is formed by a radially outwardly protruding section having at least one projection radially deflectable inwardly into an axial engagement position rearward the adjustment nut.

14. The construction support according to claim 1, wherein the adjustment nut is positively arranged on the outer tube in the axial direction such that the adjustment nut has play and is rotatable in the circumferential direction via a retaining element positively held in the axial direction on the outer tube.

15. The construction support according to claim 14, wherein the retaining element is a retaining ring spanning the outer tube.

16. The construction support according to claim 14, wherein the outer tube comprises a support section in the longitudinal end region for axially bearing the retaining element from below, and wherein the support section is formed by scoring and bending material of the outer tube.

17. The construction support according to claim 14, wherein the retaining element comprises at least one or multiple projections radially deflectable inwardly which axially engage rearward the adjustment nut in a circumferential groove of the adjustment nut.

18. The construction support according to claim 14, wherein the adjustment nut comprises multiple tool attachment points having wing-shaped hammer stop surfaces.

19. The construction support according to claim 14, wherein the retaining element is a ring that extends around an outer circumference of the outer tube.

* * * * *